Patented Apr. 5, 1938

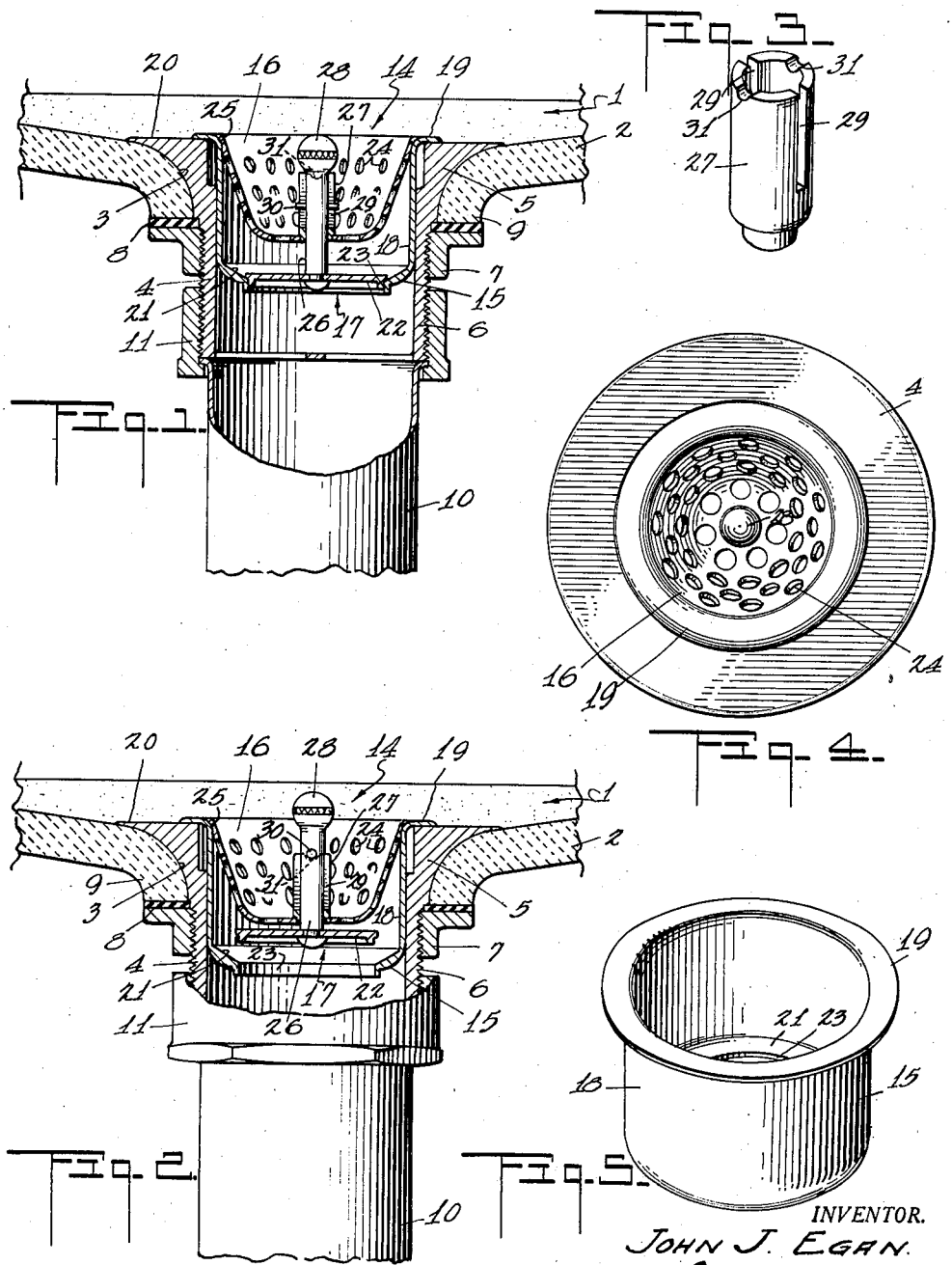

2,112,834

UNITED STATES PATENT OFFICE 2,112,834

CONTROL FOR SINK OUTLETS

John J. Egan, San Francisco, Calif.

Application January 11, 1937, Serial No. 119,964

10 Claims. (Cl. 4—287)

The present invention relates to improvements in controls for sink outlets, and has particular reference to a combination strainer and stopper adapted for insertion into a sink drain.

As the principal object of my invention I propose to provide a device of the character described, which may be readily applied to a conventional sink drain without requiring alterations in the latter. The strainer is arranged to screen out waste material from the liquid while the stopper is made to be selectively used as a closure in the outlet of the sink.

It is further proposed to provide a strainer and a stopper which may be removed from the sink drain as a unit. The strainer is made for controlling access to the stopper and for preventing waste material from interfering with the operation of the stopper. The stopper is arranged beneath the strainer, and I provide manipulating means extending through the strainer so as to be operated from a position thereabove.

As a still further object I provide a strainer of novel construction that will not readily clog, the side wall of the strainer being conical shaped so as to be spaced from the wall of the supporting structure.

With these and other objects in view, my invention consists in the combinations, constructions and arrangements hereinafter described and claimed.

For a better understanding of my invention reference should be had to the accompanying drawing, forming part of this application, in which:

Figure 1 is a vertical section through a conventional sink drain showing my outlet control applied thereto, the stopper being shown in closed position;

Figure 2 a similar view with the stopper opened to permit draining of the sink;

Figure 3 an enlarged perspective view of my guide sleeve;

Figure 4 a plan view of Figure 1; and

Figure 5 a perspective view of the cup which I employ.

In carrying my invention into practice I make use of a sink indicated generaly at 1 and including in its structural features a bottom 2, which is inclined in the manner shown so as to drain the contents of the sink toward an opening 3 formed therein.

In conventional sink construction, a tail-piece 4 is introduced into the opening 3, and the tail-piece has an enlarged head portion 5 for snugly engaging with the wall defining the opening. A threaded shank is provided as at 6 for receiving a flanged nut 7, and a gasket 8 is interposed between the upper face of the nut and the boss 9 formed around the opening 3. A drain pipe 10 is secured to the threaded shank 6 by means of a coupling 11, and this pipe is usually connected to a trap, (not shown).

The foregoing parts form no part of my invention, except insofar as they cooperate with the parts now to be described. The manner of attaching the drain pipe to the sink may be changed and has been shown for the purpose of illustration only.

I provide a combination strainer and stopper as indicated at 14, which consists of a cup 15 adapted for insertion into the tail-piece, a strainer 16 mounted across the cup, and a stopper 17 disposed beneath the strainer.

It will be noted that the cup has a cylindrical section 18 which telescopes into the tail-piece and that an outstanding flange is provided as at 19 adapted to rest upon the upper face 20 of the tail piece so as to support the cup. At the bottom of the cup I form an inwardly-extending flange 21, which provides a seat for a disc 22 forming part of the stopper, the disc being made to serve as a closure over the opening 23 fashioned in the bottom of the cup.

The strainer 16 is made conical-shaped and has perforations 24 in the side wall and bottom thereof. The strainer is supported on the rim section 25 of the cup by being pressed thereinto, or otherwise suitably secured to the cup so as to form a unit therewith. Particularly it should be noted that waste material is screened out of the liquid in the sink by means of the strainer, and that the waste material is thus prevented from passing downwardly into the drain and interfering with the stopper.

The strainer in reality serves as a small colander, and it will be noted that the wall thereof is spaced away from the cylindrical section 18 of the cup. In the event that the waste material collected in the strainer should clog some of the lower openings the upper openings will still remain active and will permit the liquid to drain from the sink.

For operating the stopper I provide a rod 26, which is secured to the disc 22, and extends upwardly through a sleeve 27 rising from the strainer. The sleeve is fixed to the strainer and forms part thereof. The upper end of the rod 26 terminates in a head 28, which may be manually grasped for the purpose of unseating the disc 22 with respect to the inwardly-extending flange 21 at the bottom of the cup.

For guiding the movement of the rod 26 I provide diametrically disposed slots 29 in the sleeve 28, (see Figure 3), which extend downwardly from the upper end of the sleeve, and a pin 30 projects through the rod and into the slots. Upon lifting the disc 22 from its seat into the position illustrated in Figure 2, the pin is moved out of the slots, and after the rod 26 has been given a quarter turn the pin is brought to rest in notches 31 fashioned in the upper end of the sleeve.

The notches 31 serve to hold the stopper in opened position, and the notches are located so as to place the disc 22 in slightly spaced relation with respect to the bottom of the strainer as shown in Figure 2. This permits liquid to drain through the openings in the bottom of the strainer when the stopper is opened.

From the foregoing description of the various parts of the device, the operation thereof may be readily understood. When it is desired to use my outlet control as a stopper, the disc 22 is lowered upon the flange 21 to form a liquid tight seal therewith. The suction created by any liquid, which may be passing downwardly through the drain at the time the disc is being seated, will also serve to draw the disc upon its seat.

In emptying the sink, the head 28 of the rod 26 is raised so as to unseat the disc, and the rod is then rotated to position the pin 30 in the notches 31 and to maintain the stopper opened. Any waste material that may be present in the liquid in the sink will be received in the strainer 16, which is made in the nature of a perforated basket or colander.

My combination strainer and stopper may be bodily withdrawn from the sink outlet as a unit by means of the head 28, which is located in the center of the strainer and axially of the cup 15 so as to permit the head to be easily grasped by the fingers of an individual.

In cleaning the device, the disc 22 is first moved into opened position, and the cup 15 is then inverted under a faucet and water allowed to enter the opening 23 in the cup so as to dislodge waste material from the strainer and to otherwise clean the unit.

It should be noted that my device may be applied to a larger tail-piece than the one illustrated in the drawing, in which case the outstanding flange 19 on the top of the cup would still engage with the tail-piece to support the cup in the sink outlet.

While I have shown only the preferred form of my invention it should be understood that various changes or modifications may be made within the scope of the appended claims without departing from the spirit of the invention.

I claim:

1. In combination, a cup insertable into a sink drain and formed with a passageway leading therethrough, a strainer mounted in the passageway, a stopper disposed below the strainer and being movable into position to cooperate with the cup to form a closure in the passageway, a sleeve rising from the strainer, and a rod connected to the stopper and passing upwardly through the sleeve to provide operating means for the stopper.

2. In combination, a cup insertable into a sink drain and formed with a passageway leading therethrough, a strainer mounted in the passageway, a stopper disposed below the strainer and being movable into position to cooperate with the cup to form a closure in the passageway, a slotted sleeve rising from the strainer and having notches formed in the upper end thereof, a rod connected to the stopper and passing upwardly through the sleeve to provide operating means for the stopper, and a pin extending through the rod and into the slots of the sleeve, the rod being movable to engage the pin in the notches when opening the stopper to hold the latter in opened position.

3. A control for a sink outlet comprising a tail piece having means for securing the same in the outlet, a cup having a side wall adapted to be slidably received in the tail piece and having means for suspending the same in the upper end of the latter, the cup having an opening in the bottom thereof and a valve for closing the opening.

4. A control for a sink outlet comprising a tail piece having means for securing the same in the outlet, a cup having a side wall adapted to be slidably received in the tail piece and having means for suspending the same in the upper end of the latter, the cup having an opening in the bottom thereof, a valve for closing the opening and a strainer in the cup controlling access to the valve opening.

5. A control for a sink outlet comprising a tail piece having means for securing the same in the outlet, a cup having a side wall adapted to be slidably received in the tail piece and having means for suspending the same in the upper end of the latter, the cup having an opening in the bottom thereof, a valve for closing the opening and a strainer in the cup controlling access to the valve opening, the valve having manipulating means projecting through the strainer.

6. A control for a sink outlet comprising a tail piece having means for securing the same in the outlet, a cup having a side wall adapted to be slidably received in the tail piece and having means for suspending the same in the upper end of the latter, the cup having an opening in the bottom thereof, a valve for closing the opening and a strainer in the cup controlling access to the valve opening, the valve having manipulating means projecting through the strainer and the latter means and the strainer having coacting means for holding the valve in open position.

7. A control unit for a sink outlet comprising a cup adapted for insertion into the sink outlet and having an opening in the bottom, a valve for the opening, and a strainer fixed in the cup above the opening and the valve, the latter having a stem projecting through the strainer whereby the entire unit may be lifted from the sink outlet by lifting the valve stem.

8. A control unit for a sink outlet comprising a cup having an opening in the bottom thereof, a valve for the opening, a strainer fixed in the cup above the opening and the valve, and a stem projecting from the valve through the strainer.

9. A control unit for a sink outlet comprising a cup having an opening in the bottom and a strainer fixed in the cup above the opening.

10. A control unit for a sink outlet comprising a cup having a cylindrical side wall and having an opening in the bottom thereof and a strainer fixed in the cup above the opening, the strainer having a frusto-conical side wall with apertures extending to the upper end thereof.

JOHN J. EGAN.